United States Patent [19]

Wicker et al.

[11] Patent Number: 4,792,859
[45] Date of Patent: Dec. 20, 1988

[54] DIGITIZING WAND ADAPTED FOR MANUAL AND AUTOMATIC OPERATION

[75] Inventors: Guy Wicker, Rochester Hills; Louis D. Swartz, Holly; Daniel H. O'Donnell, Rochester Hills; John A. Heslip, Northville; Vincent D. Cannella, Birmingham; Olivier Prache, Ann Arbor; Mark H. McCormick-Goodhart, Birmingham; Marvin C. Barnes, Troy, all of Mich.

[73] Assignee: Ovonic Imaging Systems, Inc., Troy, Mich.

[21] Appl. No.: 12,414

[22] Filed: Feb. 9, 1987

[51] Int. Cl.$^4$ .................. H04N 1/028; H04N 1/12
[52] U.S. Cl. ...................... 358/294; 358/313.31; 358/285; 358/293
[58] Field of Search .......... 358/293, 294, 285, 213.31, 358/257

[56] References Cited

U.S. PATENT DOCUMENTS

| | | | |
|---|---|---|---|
| 4,419,696 | 12/1983 | Hamano | 358/213.31 |
| 4,634,883 | 1/1987 | Nishiura | 358/213.31 |
| 4,641,133 | 2/1987 | Ono | 358/257 |
| 4,652,937 | 3/1987 | Shimura | 358/293 |
| 4,684,998 | 8/1987 | Tanioka | 358/293 |
| 4,691,243 | 9/1987 | Cannella | 358/294 |
| 4,691,244 | 9/1987 | Cannella | 358/294 |
| 4,707,747 | 11/1987 | Rockwell | 358/293 |
| 4,725,889 | 2/1988 | Yaniv | 358/285 |

*Primary Examiner*—Howard W. Britton
*Attorney, Agent, or Firm*—Marvin S. Siskind; Richard M. Goldman; Kenneth M. Massaroni

[57] ABSTRACT

Digitizing apparatus for reproducing information from an image-bearing member, said apparatus including a wand removably mounted on a base station. The wand is adapted for independent operation to manually scan said image-bearing member or the wand can be secured to the base station for automatically scanning said image-bearing member.

2 Claims, 7 Drawing Sheets

DIGITIZING WAND ADAPTED FOR MANUAL AND AUTOMATIC OPERATION

FIELD OF THE INVENTION

This invention relates to a digitizer which employs an array of photosensors for producing electronic signals representative of the shape and color of an image on, or the visually detectable condition of a surface such as a printed page, a drawing, or the like.

As disclosed herein, such digitizers typically include an elongated array of thin film photosensitive elements, said array preferably equal at least in length to one dimension of the surface to be scanned. The digitizers of the instant invention include a portable digitizing wand adapted to be manufally moved across the surface of an image-bearing member being scanned; and a base station which supports the wand when not in use, and which has the further capability of providing for the automatic scanning of a document placed therein.

BACKGROUND OF THE INVENTION

Electronic imaging or scanning systems are commonly used to transform an image or an image-bearing surface from one form, such as a paper original, to an electronic form, such as a digital or analog signal. Once an image is converted to electronic form, many uses of that signal become possible, including, without limitation, the reproduction of the image onto a piece of paper, the projection of the image onto a video display terminal, the transmission of the image to a remote location, and the further processing of that image, such as by a computer, an optical pattern recognition device, or the like.

Electronic imaging systems typically include an array of photosensitive elements, such as photosensors, and a light source operatively disposed to provide illumination of the surface being scanned. In those instances where a linear array of photoresponsive elements is employed, it is necessary that either the image on that surface is moved in a direction perpendicular to the longitudinal axis of the linear array, or the linear array of photoresponsive elements is moved in a direction perpendicular to the longitudinal axis of that surface. Alternatively, in those instances where a two dimensional array of photoresponsive elements is employed, the entirety of the document may be scanned without the need for relative motion therebetween. Regardless of whether linear or two dimensional arrays are employed, the light reflected from the image-bearing surface varies depending upon the image on any small area portion of the surface being scanned, i.e., a darker portion of the surface will cause the photosensitive elements to receive less reflected light, while a brighter portion of the surface will cause the photosensitive elements to receive more reflected light. Since the photosensitive elements effect a detectable change in the electrical conductivity thereof in response to the receipt of differing amounts of incident radiation, the change in conductivity can be detected and relayed in the form of electrical signals.

It will be appreciated that electronic image scanning systems are of great commercial utility insofar as they permit the conversion of human readable data into electronic format, which format is compatible with various electronic processing, transmission and storage operations. Accordingly, electronic image scanners have gained acceptance in such diverse fields as publishing, finance, engineering, telecommunications and the graphic arts. Since electronic image scanners are essentially the "eyes" of data processing systems, their ubiquity should be as great as that of the desk-top computer terminal; however, such is not the case at present point in time owing, in part to the expense, size and limited scanning capacity of heretofore available scanners.

The assignee of the subject invention has already developed large area electronic image scanners which are specifically adapted to reproducibly scan a pattern of information on a drafting table or a marker board and produce a digital signal corresponding thereto. Such large area scanners are disclosed in commonly assigned U.S. patent application No. 885,907 filed July 15, 1986 and entitled "Photosensitive Line Imager Utilizing A Movable Scanning Arm, now U.S. Pat. No. 4,725,889, the disclosure of which is incorporated herein by reference. Applicants are also aware of various other commercially available image scanners; however, all of such scanners are relatively large, complex and expensive systems. Therefore, the need remain for a small size electronic image scanner, suitable for portable as well as desk-top use. Such a scanner should be relatively simple to operate and fairly inexpensive so as to be readily available as an adjunct to personal computing systems and the like. Furthermore, it is highly desirable that any such an electrical image scanner be capable of scanning irregularly shaped or oversized documents such as bound material, newspapers, magazines, plywood, textiles and the like.

The aforementioned industrial needs are fulfilled by the portable and desk-top digitizer disclosed herein. More specifically, the instant invention provides for a compact, low cost electrical image scanner capable of providing a digital signal corresponding to information upon a wide variety of substrates including, single printed pages, bound materials, oversized documents and drawings or the surface condition present on woods, metals, plastics and textiles. The scanner of the present invention includes a digitizing wand, said wand equipped with a photosensor array therein. Manual scanning of the variety of documents, or other information-bearing surfaces, may be readily accomplished by merely passing the wand across the information-bearing surface so as to allow the photosensor array to scan that surface. The scanner of the instant invention further includes a base station configured for placement on a horizontal surface such as a desk or mounting on vertical surface such as a wall. The base station is adapted to removably and operatively retain the scanning wand when the wand is not in portable use. The base station may further be provided with the capability of receiving a document to be scanned and establishing relative motion between that document and the scanning wand. Such relative motion may be achieved by either moving the document past the stationary wand or by moving the wand past the stationary document. In this manner, th image scanner of the instant invention is adapted for the automatic scanning of image-bearing documents in a manner akin to the more conventional scanners referred to hereinabove.

It may thus be seen that the present invention discloses a unique electronic image scanner which is of relatively small size so as to enable said scanner to be disposed upon desks or other work surfaces. The image scanner of the instant invention includes a demountable scanning wand which may be used in a portable manner so as to manually scan bound or odd-size documents. The image scanne of the instant invention is further adapted to automatically scan an image-bearing document placed into the base station thereof. Because of its small size and high degree of flexibility, the image scanner of the instant invention provides a high degree of utility and answers a long felt need in the industrial marketplace.

These and other features and advantages of the present invention will be apparent from the drawings, the brief description of the drawings and the detailed description of the drawings which follow.

BRIEF SUMMARY OF THE INVENTION

There is disclosed herein a digitizer which is adapted to generate detectable electrical signals corresponding to an image on an image-bearing member. The digitizer comprises an elongated digitizing wand and a base station. The wand is sized and shaped for portable use and is specifically adapted to be manually moved across an image-bearing member and thereby scan same. The wand includes a photoresponsive array of light sensitive elements, each element adapted to receive light from a corresponding small area portion of the image-bearing member and generate a detectable signal representative of the amount of received light. The base station includes means for receiving said image-bearing member, means for removably supporting said portable wand and drive means for providing relative motion between said member and said wand at a preselected rate of speed. In this manner, the digitizer is adapted to manually as well as automatically scan an image-bearing member.

Preferably, the wand is at least $8\frac{1}{2}$ inches in length and the photoresponsive array of light sensitive elements disposed therein is linear. Each light sensitive element is a p-i-n diode which can be operated in either the third or fourth quadrant of its IV curve. If the diode is adapted for third quadrant operation, said diode is reverse biased and if the diode is adapted for fourth quadrant operation, said diode is forward biased. The light sensitive elements include at least one layer of amorphous silicon alloy semiconductor material which preferably further includes hydrogen and fluorine. The semiconductor alloy material may further include a band gap modifying element for adjusting the photoresponse of said light sensitive elements to specific wavelengths of incident radiation.

The photosensitive array is formed as a plurality of deposited, light sensitive semiconductor elements, each of said elements being non-light transmissive, non-apertured, continuous and adapted to receive light from the corresponding small area portion of said image-bearing member. Further, said array may include spacing means for closely positioning said light sensitive elements in juxtaposed relation relative to the image-bearing member so as to proximity focus light onto said light sensitive elements from corresponding small area portions of said member.

The photoresponsive array should further be provided with a static shielding layer adapted to prevent the accumulation of static electrical charge thereupon which charge is generated by the motion of the image-bearing member relative to the array. The static shielding layer is formed atop an insulative layer which in turn is formed directly atop the upper electrode of the light sensitive elements. Preferably, the array is completed with the deposition of an outermost hard, transparent coating disposed upon the static shielding layer, said coating adapted to prevent abrasive or other environmental factors from deteriorating the operation of said photoresponsive array.

The wand further includes means for controlling the rate of movement of the wand as it is manually moved across the image-bearing member. Alternatively, the wand may be equipped with indexing means, said indexing means adapted to generate a control signal indicative of the movement of said wand across the image-bearing member.

The digitizer preferably includes a buffer memory for storing detected electrical signals. Also associated with the wand is a printer adapted to reproduce the image on said image-bearing member from the electrical signals generated by the wand. The wand further includes means for projecting light onto the image-bearing member. The light projected onto the image-bearing member may be diffuse light and light may be of different colors (such as red, green and blue), which colors are sequentially projected onto said member.

The detectable electrical signals generated by the wand are conveyed to downstream processing equipment by connection means. The downstream processing equipment may take the form of an external copier means, a computer or a modem. The wand may operate by having incident radiation from small area segments of said image-bearing member to be received by said elements of said photoresponsive array by utilizing a lens system, a fiberoptic system or by proximity focusing methodology in which no lens is necessary.

The base station may include buffer memory adapted to store detectable electrical signals generated by the photoresponsive array. The base station may further include character recognition software adapted to sense human readable indicia upon said image-bearing member and generate a second detectable electrical signal corresponding thereto. The base station may further include word processing means, cad/cam software, a computer, and/or a modem. The base station can be equipped with a light source for projecting radiation through said image-bearing member. Finally, the base station includes drive means adapted to either move the image-bearing member past the wand or to move the wand past the image-bearing member at a preselected rate of speed.

DETAILED DESCRIPTION OF THE DRAWINGS

Figure 1:
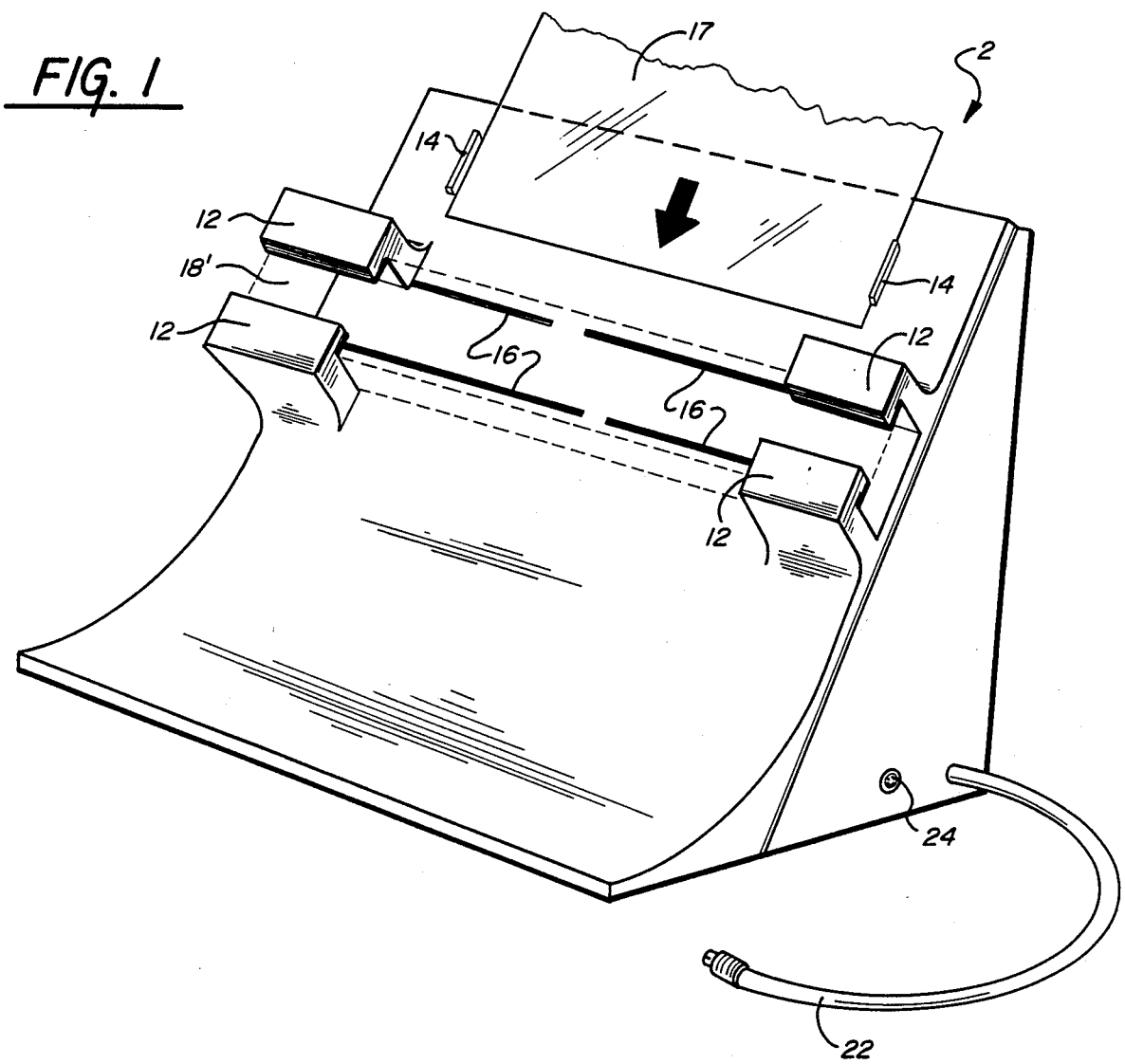
FIG. 1 is a perspective view, partially in phantom outline, of the digitizer wand and base station of the instant invention and specifically illustrating the movement of an image-bearing document past said wand.
Figure 2:
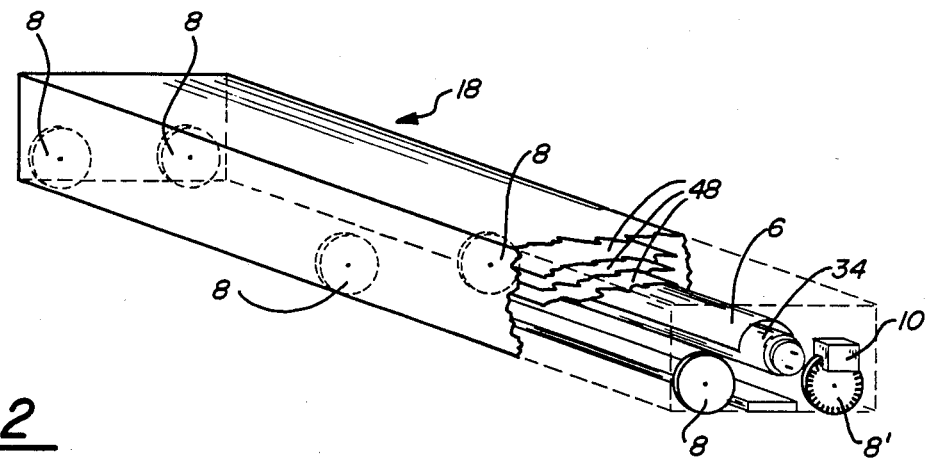
FIG. 2 is a perspective view, partially in phantom outline and partially cut-away, of the digitizer wand of FIG. 1 and illustrating the photosensitive array, the light source and the tracking wheels as operatively disposed therewithin.

Referring now to the drawings and specifically turning to FIGS. 1 and 2, those Figures illustrate the principal components of the digitizing system of the instant invention. More particularly, FIG. 2 illustrates, in cutaway perspective view, one embodiment of the digitizing wand 18, structured in accord with the principles of the instant invention and as adapted to provide detectable electrical signal corresponding the pattern of information upon an image-bearing member 17. As illustrated in FIG. 1, the entire digitizing system is depicted in cut-away perspective and is shown to further include a base station 2 adapted to removably support the wand 18. The base station 2 is specifically adapted to receive the image-bearing member 17 such as a document and to move that document past the digitizing wand operatively retained therein, and indicated by phantom outline 18'.

Referring now to FIG. 2, it will be noted that the digitizing wand 18 is a generally elongated, hand holdable, portable unit preferably having a lengthwise dimension of sufficient length to enable it to scan the entire width of the document or similar image-bearing member 17 in a single pass. As will be apparent from the cut-away view of FIG. 2, the wand 18 includes an elongated photoresponsive array 57 of a plurality of light sensitive elements 64. The elements, which will be described in greater detail hereinbelow, are each adapted to receive light from a corresponding small area portion of the surface of the image-bearing member 17 and generate a detectable electrical signal representative of the amount of light received therefrom. It will be apparent from the Figure that by moving the digitizing wand 18 across the image-bearing surface, the light sensitive elements of the photoresponsive array 57 are adapted to scan the entirety of that surface.

Also, housed within and included as part of the digitizing wand 18 is a light source 34, said light source preferably being elongated (so as to be coextensive in length with the length of the array) and operatively disposed relative to the light sensitive elements and the image-bearing member 17 so as to provide illumination to the surface being scanned. As illustrated herein, the light source 34 is an elongated fluorescent tube having a reflector 6 disposed about a portion of the circumference thereof to reflect light therefrom onto the image-bearing surface. It should be kept in mind that while a fluorescent lamp 34 has been illustrated, other light sources such as incandescent lamps, light emitting diodes andtthe like may be utilized in keeping with the spirit and scope of the instant invention. In yet other instances, the surface being scanned may be a back-lit or otherwise luminesced and the lamp 34 may not be necessary. Yet in still other instances, the digitizing wand 18 may include a window or a fiber optic light pipe for purposes of allowing ambient illumination to reach the image-bearing surface, thereby eliminating the need for any source of illumination.

The digitizing wand 18 may further include a plurality of spaced, wheel-like rollers 8 adapted to support the wand 18 while it is being moved across the surface being scanned. These rollers 8 may be wheel-like members as shown, or may alternatively be cylindrical rollers, ball bearings, low friction gliders and the like. It will be noted that one of the wheels 8' may preferably be equipped with a position encoder 10. This encoder 10 may be utilized to provide indexing signals indicative of the passage of the wand 18 across the surface being scanned. Such indexing signals can be utilized for controlling the synchronization of printers, displays, storage devices or other downstream processing equipment with the signal generated by the photosensitive array 57. The indexing signals my be utilized to provide a human-detectible signal such as an audible or visual signal indicative of the progress of the wand 18 across the document, In some instances, the indexes may sound an alarm if the velocity pf the wand 18 is too great for accurate scanning. The wand 18 is also provided with one or more printed circuit boards 48 which are adapted to contain onboard electronic circuitry for implementing necessary operations such as wand position encoding, signal processing, storage of generated signals and so forth. Such circuitry will be described in greater detail hereinbelow.

Returning now to FIG. 1, the base station 2 includes oppositely disposed pairs of spacedly positioned brackets 12 adapted to removably retain the wand 18 in operative relation to the image-bearing member 17. Alternative arrangements such as magnetic retainers, mcchanical latches, screw fasteners and the like may be similarly employed to retain the wand 18 in the aforementioned operative disposition relative to said image-bearing member. It should be noted that since the apparatus of the subject invention can be utilized in a "proximity focusing" mode of operation, it is necessary that the distance between the photosensor array 57 of the wand 18 and the image-bearing member 17 be specifically maintained. Therefore, the brackets 12 are adapted to correctly space said photosensor array 57 a given distance from the surface of the image-bearing member 17.

In addition to removably and operatively retaining the wand 18, the base station 2 is further adapted to provide for the automatic scanning of image-bearing documents and the like by providing for relative motion between the wand 18 and the document 17. As illustrated, the base station 2 includes a pair of spacedly positioned document guides 14 (the space therebetween being approximately equal to the width or length dimension of the documents being scanned), said guide adapted to movably guide the document through the base station 2 in spaced relation to the photosensor array 57 of the wand 18. Also included as part of the base station 2 are two pairs of drive rollers 16 which are disposed so as to frictionally engage the underside of the document 17 and the circumferential portion of the wheels 8 of the wand 18 so as to positively feed the document 17 past the array 57 of photosensitive elements 64 for scanning the image on the image-bearing document 17 at a predetermined rate of speed.

The base station 2 further includes a connector cable 22 adapted to electrically inteeconnect and digitally communicate with the wand 18 so as to carry digital signals therefrom to the base station 2 for further processing therein. The base station 2 is further equipped with a connector port 24 adapted for electrical interconnection to further downstream processing or display devices such as memory storage, word processing, computers, or printers. Although not shown in the Figure, the base station 2 may further include electronic circuitry for internally storing or processing signals provided by the wand. For example, the base station 2 may include a large capacity data storage system such as a hard disk or semiconductor memory storage for retaining scanned data. The base station 2 may additionally include a computer and allied software for performing operations such as word processing, character recognition, data formatting, signal compression, CAD/CAM image processing, telecommunication and the like. Additionally, the base station 2 may include a user accessible control panel for regulating the operation of the scanning system.

Figure 3:
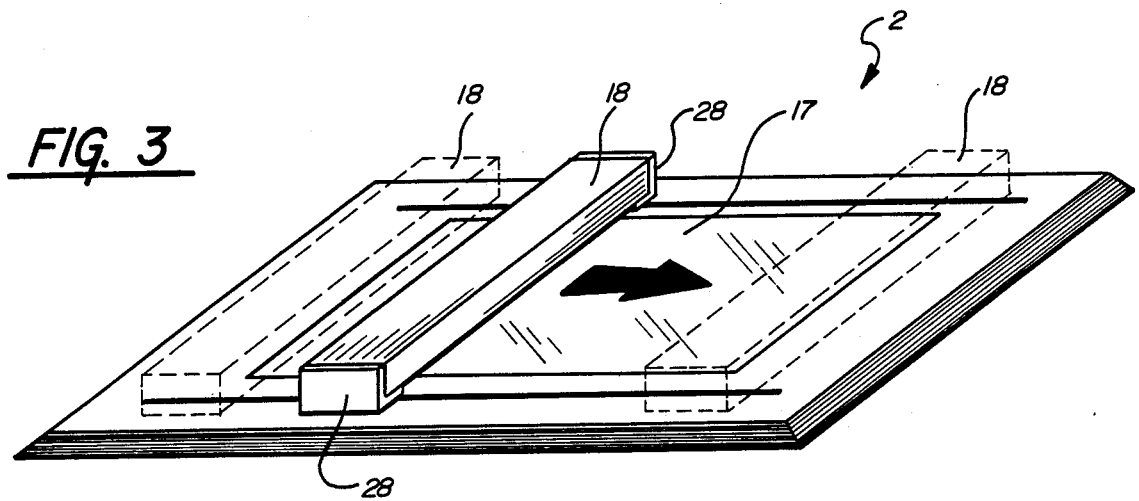
FIG. 3 is a perspective view, partially in phantom outline, illustrating an embodiment of the base station and digitizer wand as operatively configured for movement of the wand relative to an image-bearing member.

Referring now to FIG. 3 there is shown yet another embodiment of the scanning system of the instant invention. As illustrated in FIG. 3, the scanning system includes a digitizing wand 18, which wand is generally similar in structure and function to the wand described hereinabove with reference to FIG. 2. Where the embodiment of FIG. 3 differs from that previously described is that the base station 26 thereof is a generally planar assembly so as to be particularly adapted to move the removably retained digitizing wand 18 across a generally immobile document 17. Toward that end, the base station 26 includes (1) a pair of spacedly positioned mounting brackets 28 adapted to removably retain the wand 18, and (2) a drive system for moving the wand across the image-bearing surface of the document 17. Obviously, other combinations of base stations and digitizing wand may be utilized which will provide for relative motion (both linear and curvilinear) between the image-bearing member and the wand without departing from the spirit and scope of the instant invention. For example, the document may be wrapped about a cylindrical support member and rotated past a fixed wand. Numerous other such modifications will be eadily apparent to those of skill in the art.

Turning now to FIGS. 2A-2D, the general structure of the array 57 of light sensitive elements 64 of the instant invention will be described in detail. The description will begin with specific reference to FIG. 2C, wherein is shown, in partial cross-sectional view, one particular photosensor array 57 as adapted for use in the digitizing wand of the instant invention and including a plurality of photosensitive elements 64 therein. The array 57 is typically fabricated upon a substrate 30 which may be formed upon an electrically conductive material such as a stainless steel or aluminum member or, in some instances, may be formed upon an insulating body such as glass or a synthetic polymeric member. As specifically illustrated in FIG. 2C, the substrate 30 is formed from an electrically insulative substrate. Accordingly, each of the photosensitive elements 64 is provided with a base electrode 36 generally formed by depositing a patterned metallic material upon the substrate 30. Each of the photosensitive elements 64 further includes a second electrode 38 disposed upon the light incident surface thereof and typically formed from a light transmissive material such as indium tin oxide, tin oxide, indium oxide, cadmium oxide, zinc oxide and the like. Disposed between the two electrodes 36 and 38 is a body of thin film semiconductor alloy material adapted to receive light from the surface being imaged and generate a detectable electrical signal representative of the amount of received light. The semiconductor body may take many forms, said forms being well knonn to those skilled in the art. For example, the semiconductor body may be formed from photoconductive material, in which case the resistivity thereof will change depending upon the level of illumination incident thereupon. By measuring this resistivity and the intensity of light incident thereupon, the signal from the image-bearing surface may be measured. In other instances, the semiconductor body may take the form of a photovoltaic cell which is specifically adapted to generate a flow of electrical current in response to the amount of incident illumination.

Figure 2A:
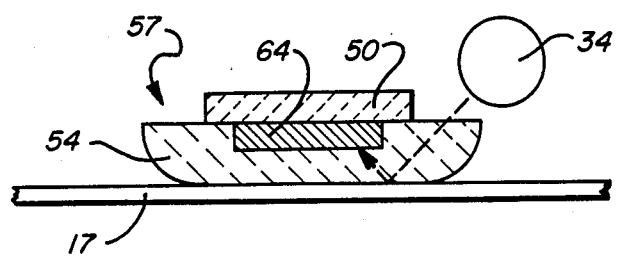
FIG. 2A is a cross-sectional view of the use of a contact imaging technique to reflect incident radiation from the image on an image-bearing document onto a corresponding light sensitive element of the photoresponsive array illustrated in FIG. 2.
Figure 2B:
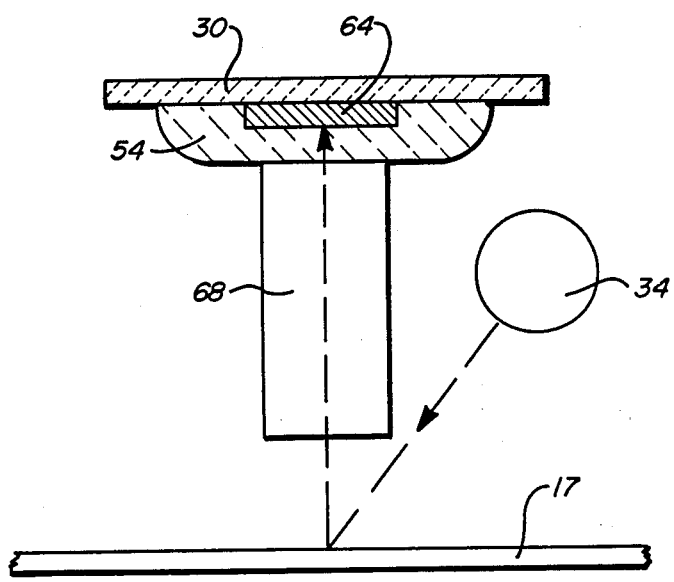
FIG. 2B is a cross-sectional view of the use of an optical lens technique to receive incident radiation from the image on an image-bearing document onto a corresponding light sensitive element of the photoresponsive array illustrated in FIG. 2.
Figure 2C:
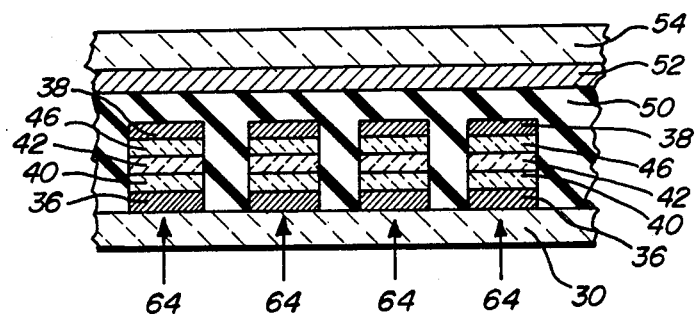
FIG. 2C is a partial cross-sectional view of the array of photoresponsive elements illustrated in FIG. 2 and specifically depicting the configuration of the pixel elements from which the array is fabricated.

As illustrated in FIG. 2C, the body of semiconductor alloy material of each of the photosensitive elements 64 is configured as a p-i-n type photovoltaic diode and accordingly includes a first layer of p-doped thin film semiconductor alloy material 40, a second layer of n-doped thin film semiconductor alloy material 46 and a layer of substantially intrinsic semiconductor material 42 interposed therebetween. The photosensor array 57 further includes a body of electrically insulating material 50 encapsulating the individual photosensitive elements 64. The insulating material 50 may be formed from silicon oxide, silicon nitride, synthetic organic polymers and the like. It is to be noted that regardless of the material of formation, said insulating material 50 functions to electrically isolate, as well as mechanically protect, the plurality of photosensitive elements 64.

It is generally preferable that the photosensitive array 57 further include a static shielding layer 52 operatively disposed between the photosensitive elements 64 and the image-bearing surface being scanned. It is the function of the static shielding layer 52 to protect the underlying photosensitive elements 64 from damage occasioned by high voltage static electrical fields resulting from the friction developed during the movement of the photosensor array 57 relative to the surface of the image-bearing member 66 being scanned. The static shielding layer 52 is preferably fabricated as a thin, deposited light transparent layer formed from an electrically conductive material such as a degenerate semiconductor. In general, the static shielding layer 52 may be fabricated from materials similar to that utilized to form the top transparent conductive electrode 38 of the photosensor array 57 of photosensitive elements 64. A complete description of such static shielding layers can be found in commonly assigned U.S. Pat. No. 4,691,244, the disclosure of which is incorporated herein by reference.

The photosensor array 57 may further include a transparent wear resistant layer 54 disposed atop the static shielding layer 52. The wear resistant layer 54 is also preferably a light transmissive layer and is fabricated from a material having a relatively high degree of abrasion resistance. Among the materials which may be utilized from which to fabricate the waar resistant layer are silicon oxides, silicon nitrides, silicon oxy-nitrides, silicon carbides and various glassy materials. One particular material having a high degree of utility as a top protective layer is amorphous carbon, and particularly amorphous carbon having a primarily tetrahedral configuration. Such a material combines the desirable features of being extremely hard as well as highly transparent. A complete description of such transparent hard coatings can be found in commonly assigned U.S. patent application Ser. No. 912,476, the disclosure of which is also incorporated herein by reference.

Referring now to FIG. 2A, there is shown one mode of operation of the photosensor array 57 of the instant invention as that array is specifically adapted to scan a pattern of information disposed upon an information-bearing member 17 such as a document or other similar sheet of material. As illustrated in FIG. 2A, the photosensor array 57 is generally similar in structure to that discussed previously with reference to FIG. 2C and preferably, includes a substrate 30 having a plurality of discrete, linearly aligned photosensitive elements 64, (one of which is shown in stylized cross-section). The photosensor array 57, as depicted in FIG. 2A further includes a protective, hard, transparent coating 54 disposed about the periphery of the light sensitive elements 64 thereof.

As illustrated in FIG. 2A, the photosensor array 57 in the wand 18 is adapted to operate in a proximity focusing mode, that is to say, said array has an operational mode in which the photosensitive elements 64 are maintained in relatively close proximity to the mmage-bearing surface 17 being scanned. This close proximity relationship is maintained by a transparent spacing member, in this instance the spacing member being the aforementioned hard coating 54. In a proximity focused mode of operation, a light source 34 is operatively disposed within the portable wand 18 so as to direct radiation of a preselected wavelength upon the surface of the image-bearing member 17 in such a manner that radiation reflected from small area portions of that surface will strike corresponding small area photosensitive elements 64 maintained in proximate relation thereto. Because of the close spatial relationship between the discrete photosensitive elements 64 and the corresponding small area portions of the image-bearing member 17, each small area element 64 is illuminated only by light emanating from corresponding small area portions of the image-bearing member 17. In this manner, the image is essentially "focused" onto the individual photosensitive elements 64 without the need for amplifying or reducing lenses or similar optical elements.

It should be apparent that the proximity focusing system shown with reference to FIG. 2A may be modified and still retain its essential function. For example, the transparent hard coating 54 may be replaced by another transparent material such as glass or a synthetic polymeric material either with or without an optional hard coating upon the surface which engages the image-bearing member 17 being scanned. In some instances, the transparent coating 54 may be completely eliminated and the proximity relationship of the photosensitive elements 64 to the small area positions of the image-bearing member 17 may be maintained by mechanical control of the position of both the image-bearing member 17 and the photosensor array 57. Other modifications may involve repositioning the elongated light source 34 so as to illuminate the image-bearing member 17 from beneath (in those instances where said member is transparent); or said image-bearing member 17 may be illuminated from a position to the side of the photosensor array 57 (in those instances where a 2-D array is employed). It is to be noted that regardlsss of modifications, the key element which typifies this type of "proximity focusing" is a substantially one-to-one relationship between the size of the small area portions of the image sensed by any given light sensitive element and the size of that light sensitive element itself.

Other optical arrangements may also be utilized to focus an image from said image-bearing member 17 onto the photosensor array 57 without departing from the spirit or scope of the instant invention. Referring now to FIG. 2B, there is shown one such alternative optical arrangement which employs a generally cylindrically-shaped, fiber-optic-like lens for directing incident radiation from the surface of the image-bearing member 17 to the appropriate small area photosensitive element 64 of the large area array 57. As shown in FIG. 2B, light emanating from the elongated light source 34 is reflected from a small area portion of the image-bearing surface 17 being scanned, in all directions including the direction substantially perpendicular to the plane of the image-bearing surface 17. Arranged substantially perpendicular to the plane of the surface 17 is an elongated, linear, non-inverting imaging lens 68, as for example, a one-to-one magnification ratio lens produced by Nippon Sheet Glass Company, Limited of Tokyo, Japan (Selfoc lens array, Cat. No. SLA-09). It is to be noted that the precise dimensions of the surface area viewed for imaging by each of the photosensitive elements 64 of the array 57 will depend upon the specific lens selected. In one preferred embodiment, the focal length of each member of the lens array 52 is selected to be about 14 millimeters, and the width of the linear area being imaged is about 0.87 millimeters. Accordingly, the proper operative placement of the lens array 52 with respect to the image-bearing member 17 will provide for focused signals from the appropriate small area portion of the image-bearing surface to be received by the corresponding small area photosensitive elements.

As should be apparent to those ordinarily skilled in the art, other modifications of the optical system may be made in keeping with the spirit and scope of the instant invention. For example, the cylindrical lens 68 may be replaced with a more conventional type of lens. Likewise, a fiber-optic element may be utilized to convey incident radiation to a given photosensitive element 64 from a corresponding small area portion of the image-bearing surface 17 without loss.

Typically, the photosensors 64 (which are pixels or the picture elements of the matrix) are deployed in either a linear or a two dimensional array. A two dimensional array of pixels may be utilized to scan an iimage-bearing member brought into proximity therewith, whereas a linear array of photosensor elements must be moved relative to the image-bearing member in order to provide a signal indicative thereof. In order to address an array of pixels, various multiplexing schemes are utilized, as detailed in, for example, commonly assigned U.S. patent application Ser. No. 885,897 filed July 15, 1986, the disclosure of which is incorporated herein by reference.

In a typical array of photoresponsive elements, each pixel includes a blocking element or isolation device such as a diode, transistor or threshold switch disposed electrically in series with the photogenerative element. The blocking element is provided to assure that only electrical signals from preselected or addressed pixels are being read at any given time. When the pixel is sensing information, the photogenerative element produces an electrical signal, namely a photocurrent, which acts to dissipate the charge initially stored thereon. The blocking element prevents dissipation of the stored charge on the pixel. When the charge remaining or cumulatively stored in the pixel is to be read, the blocking element is rendered conductive, as for example by forward biasing a diode. The isolation element of each pixel has a capacitance associated therewith and this capacitance can degrade the operation of the pixel. For example, the capacitance of the blocking element can provide a charge of opposite polarity to that stored on the capacitance of the photogenerative element, thus tending to decrease the sensitivity of the pixel. This effect has been found in every multiplexing scheme heretofore utilized and is called the "capacitive kick" effect.

When the isolation device is switched from its off or blocking condition to its on or conducting condition to read the pixel by recharging the capacitance associated with the photogenerative element, the current required to dissipate the charge present on the isolation device cannot be distinguished from the current required to recharge the pixel capacitance. A similar and possibly more serious problem referred to as "capacitive kick back" occurs at the end of the read period when the isolation device is switched from its on condition to its off or blocking condition. Typically, the isolation device at this point has a significant voltage drop impressed across its current-carrying electrodes, which voltage drop causes a significant transfer of charge from the capacitance of the photogenerative element of the pixel to the capacitance of the isolation element. This transfer of charge disturbs the desired voltage to be applied across the photogenerative element, and is not readily distinguishable from the current produced by reading the pixel and adversely affects the accuracy of the measurement of the light intensity incident on the pixel during the subsequent scanning cycle.

In conventional photosensor arrays, the capacitive kick effect is always present and adversely affects the signal-to-noise ratio and accuracy of the reading obtained from the pixels. The magnitude of the capacitive kick back problem is directly related to the relative size or ratio of the capacitances of the photogenerative element and isolation element. The capacitance of circuit elements and devices is generally directly related to their physical size. For this reason, it is generally preferred in conventional designs that the relative areas of the photogenerative element to the blocking element be in a ratio of at least 5 to 1 and preferably 10 to 1 or more.

The capacitive kick becomes a significant problem severely limiting performance of high resolution photosensor arrays which include relatively small area photogenerative elements. The reason for the increase in the capacitive kick problem is that in such arrays the ratio of the areas of the photogenerative and blocking elements is significantly decreased. The desired larger ratios cannot be maintained because of constraints of lithography and processing which set a lower limit on blocking element size, particularly in large area arrays where yield problems become much more severe as minimum lithography feature sizes decrease. As a result, the absolute sensitivity and speed of operation have heretofore been decreased as the resolution of photosensitive pixel arrays has increased.

Applicants' assignee has discovered that by providing a pixel which includes a photogenerative element and a blocking means, which blocking means includes at least two current blocking elements electrically interconnected in series relationship, the capacitive kick back effects of the blocking elements tend to cancel out. This is also believed to significantly reduce capacitive kick when the isolation means is switched from its non-conducting to conduction state. Since the capacitive kick is thus significantly reduced or eliminated, the sensitivity of the pixel and the accuracy with which a pattern of data is scanned is increased significantly.

Figure 2D:
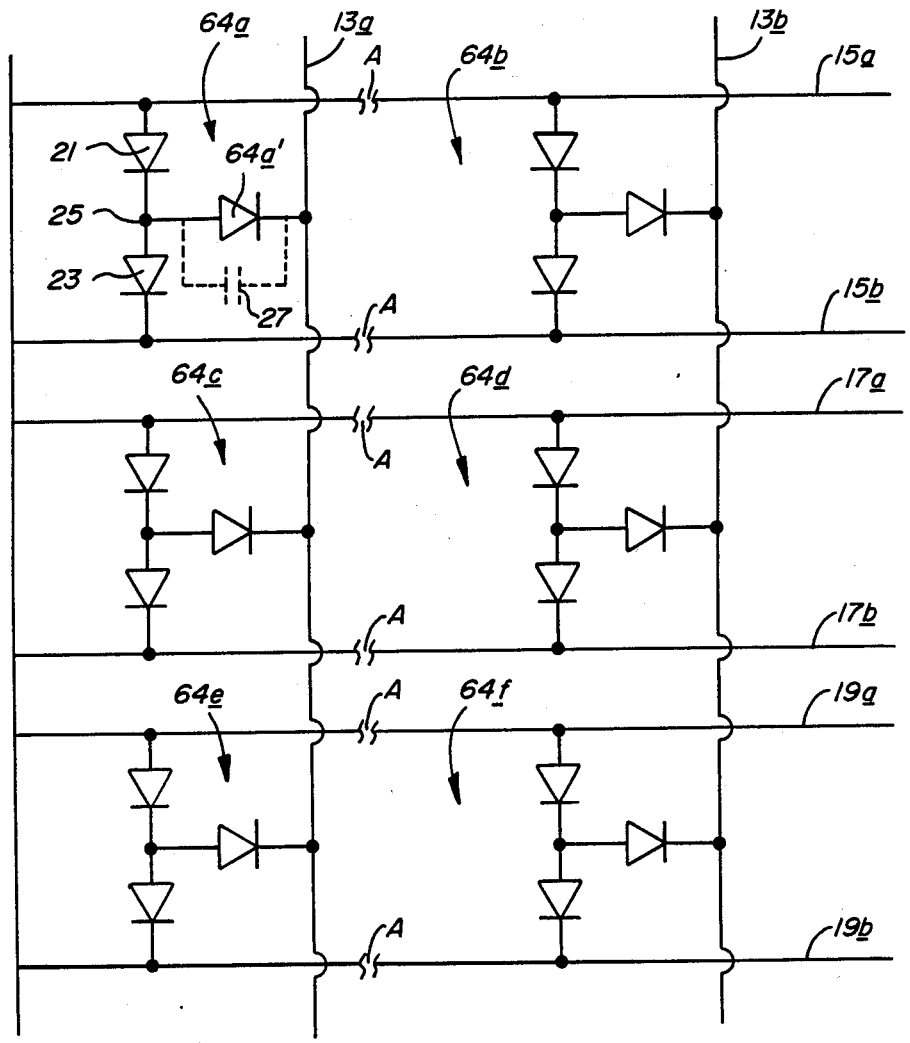
FIG. 2D is a schematic circuit diagram of an electronic matrix system illustrating one embodiment of the present invention by which isolation of pixel elements can be achieved without "capacitive kick"

Referring now to FIG. 2D, there is illustrated, in schematic circuit diagram form, an electronic matrix system generally 11 depicting several pixels (light sensitive elements 64a–64f) of the photosensor array 57. The break lines A are indicative of the fact that while a two dimensional (2D) array which can be read in parallel fashion is shown, a linear array which could be read using a single multiplexed output line 13 could be similarly fabricated. The array 11 includes a plurality of address line pairs 15a, 15b, 17a, 17b, 19a and 19b, which line pairs are electrically in parallel and may be called row select lines; and a plurality of ouptut lines 13a and 13b which are electrically connected in parallel with one another and may at times be called column address lines. In two dimensional photosensor arrays, the column address lines 13a and 13b typically cross the row select address line pairs at an angle such as ninety degrees and are spaced from the row select address line pairs to form a plurality of insulated crossover points therewith. In linear photosensor arrays, the row select lines and one or more output lines may still be electrically arranged with respect to one another in a matrix form, if desired, to define electrically distinct locations for pixels similar to that of two dimensional arrays. Accordingly, it is to be appreciated that the schematic diagram of FIG. 2D may be applied to photosensitive arrays which are physically arranged in either one or two dimensions.

Since the pixels 64a–64f of the array 11 are substantially identical, only pixel 64a need be described in detail herein. Pixel 64a includes isolation means provided by two blocking elements, such as a pair of isolation devices 21 and 23 which are coupled together at a common node 25. The isolation devices 21 and 23 may take the form of blocking diodes as shown, which devices are coupled together in non-opposing series relation between the row select address line pairs 15a and 15b. It is to be understood that while the isolation devices have been depicted as diodes, these devices can be fabricated in any form which provides a high impedance to current flow when reverse biased or turned off and a comparatively low impedance to current flow when forward biased or turned on. Therefore, the isolation devices may take the form of bidirectional threshold devices, transistors such as field effect transistors, etc. as described in commonly assigned U.S. patent application Ser. No. 908,423, the disclosures of which is incorporated herein by reference.

The pixel 64a further includes a photogenerative (light sensitive) element 64a', which element is adapted to absorb incident radiation and provide a detectable electrical signal corresponding to the total amount of said radiation. The photogenerative elements of FIG. 2D, are illustrated as being photodiodes, although, as previously stated, other elements such as photoresistors and phototransistors may be similarly employed. The photodiode of each pixel is electrically connected to the common node 25 formed by the blocking diodes 21 and 23 and to its respective column address line 13a or 13b.

A capacitance is provided with or inherent in each element for the storage of charge thereupon. When the element is a vertically arranged photodiode, the electrodes of the diode itself typically form and provide the desired amount of capacitance. If the element does not have sufficient inherent capacitance, a separate capacitor, preferably integrally formed adjacent to the element and as part of the pixel, may be provided in any conventional or suitable form well known or available to those in the art. For convenience, the capacitance provided with or inherent in element is shown in phantom in FIG. 2D, as capacitor 27, and is coupled between the common node 25 and the column address line 13 in parallel with the photodiode 64a'.

The isolation diodes 21 and 23 may be fabricated as Schottky barrier diodes, p-n diodes or p-i-n diodes. In thin film photosensitive arrays the isolation diodes 21 and 23 are preferably vertically arranged and formed from layers of deposited semiconductor materials such as amorphous semiconductor alloy materials. Therefore, the isolation diodes 21 and 23 are preferably formed as p-i-n diodes which include a layer of doped silicon alloy, a substantially intrinsic amorphous silicon alloy overlying the doped layer and a doped layer of silicon alloy overlying the substantially intrinsic layer.

The matrix array 11 will further include a row select driver (not shown) coupled to the row select address line pairs so as to provide drive signals for applying first operating potentials (preferably substantially equal in magnitude and opposite in polarity about the desired center node voltage) to the row select address line pairs. In this manner, the isolation diodes 21 and 23 may be forward biased or turned on to facilitate the reading or storage of charge in the photogenerative diodes coupled thereto. The row select driver also applies second operating potentials (preferably substantially equal in magnitude and opposite in polarity between the row select address line pairs) to reverse bias or turn off the isolation devices to prevent loss of the charge stored in the storage elements coupled thereto through the isolation diodes.

Lastly, the matrix array 11 will include an output amplifier circuit (not shown), the output of which is coupled to the output address lines 13a and 13b, respectively. For convenience, the output address lines will often be referred to as column address lines. The output circuit preferably maintains the inputs to the column address lines at virtual ground, that is at zero volts, while amplifying the currents produced by charging or recharging the capacitances of the pixels 64a–64f associated with column lines 13a and 13b, respectively. Maintaining all output lines at virtual ground helps in the elimination of cross-talk between groups of pixels in the matrix array.

The pixels 64a–64f of FIG. 2D, which pixels feature improved isolation means having a plurality of interconnected isolation devices and a common node to which a photogenerative element is connected, have several important advantages over the conventional prior art pixels which feature a single isolation or blocking device in series with the photoresponsive element. First, the use of a plurality of isolation or blocking elements arranged about a common node to accept or supply current from a photosensitive element enables the pixels of the present invention to be read or charged more quickly than pixels of conventional design. Second, the balanced node approach substantially eliminates or drastically reduces the capacitive kick problem of the prior art series arrangement of photogenerative elements and blocking devices. Third, high performance, high density photosensitive arrays can be constructed using isolation devices which need not be significantly smaller than the area of the photogenerative elements which they service.

The balanced node approach overcomes the capacitive kick problem in the following manner. The common node 15 is maintained at the same voltage as the isolation devices 21 and 23 are switched from their on or conducting state to their off or nonconducting state. Since the driving voltages are balanced, that is, since the driving voltages are of equal magnitude and opposite polarity relative to the voltage of node 25, the transient current flowing through the isolation diodes 21 and 23 are also balanced, and these transient currents cancel one another. Thus, there is no current flow into the photodiodes and the voltage at node 25 remains at a constant potential immediately after the isolation devices have switched from their conducting to nonconducting state. As previously mentioned, the pixel ttructure is preferably constructed so that the effective capacitances of the isolation devices, as seen or measured from the common node to which photogenerative element is connected, are substantially equal so as to achieve equal and opposite currents. It is by providing substantially equal capacitances and driving the isolation devices on either side of the common node at substantially equal and opposite potentials about the voltage intitially desired on the common node at the beginning of the scanning cycle, that transient currents flowing through the isolation devices as they are switched from on to off effectively cancel one another out. In a similar fashion, the transient currents when the isolation devices are switched from their nonconducting to conducting state at the beginning of the read portion of the scanning cycle also substantially cancel one another out. Accordingly, those in the art will appreciate that the size of the capacitances of the isolation devices relative to the capacitance of photogenerative element are less important to the sensitivity of the photogenerative element or the accuracy with which it may be read. Accordingly, with the aforedescribed pixel configuration, it is not necessary to maintain the minimum ratios between the size of the area of the photogenerative elements and blocking elements to control capacitive kick problems.

As large area linear or matrix arrays of photosensitive elements, such as those 50 cm to 200 cm or more in length, it is preferred to maintain minimum feature sizes of the blocking devices associated with the photosensitive elements relatively large, such as five or ten microns, because smaller feature sizes result in yield problems during the manufacturing process of such large area arrays. Accordingly, while the capacitive kick effect imposed a limitation in conventional arrays on how small the photosensitive elements may be made, since the utilization of a balanced drive approach substantially eliminates the capacitance of the isolation devices as a consideration, the isolation devices may now be made significantly larger than in conventional designs. Thus, very high density photosensitive matrix or linear arrays may be made with relatively large minimum feature sizes.

Figure 5B:
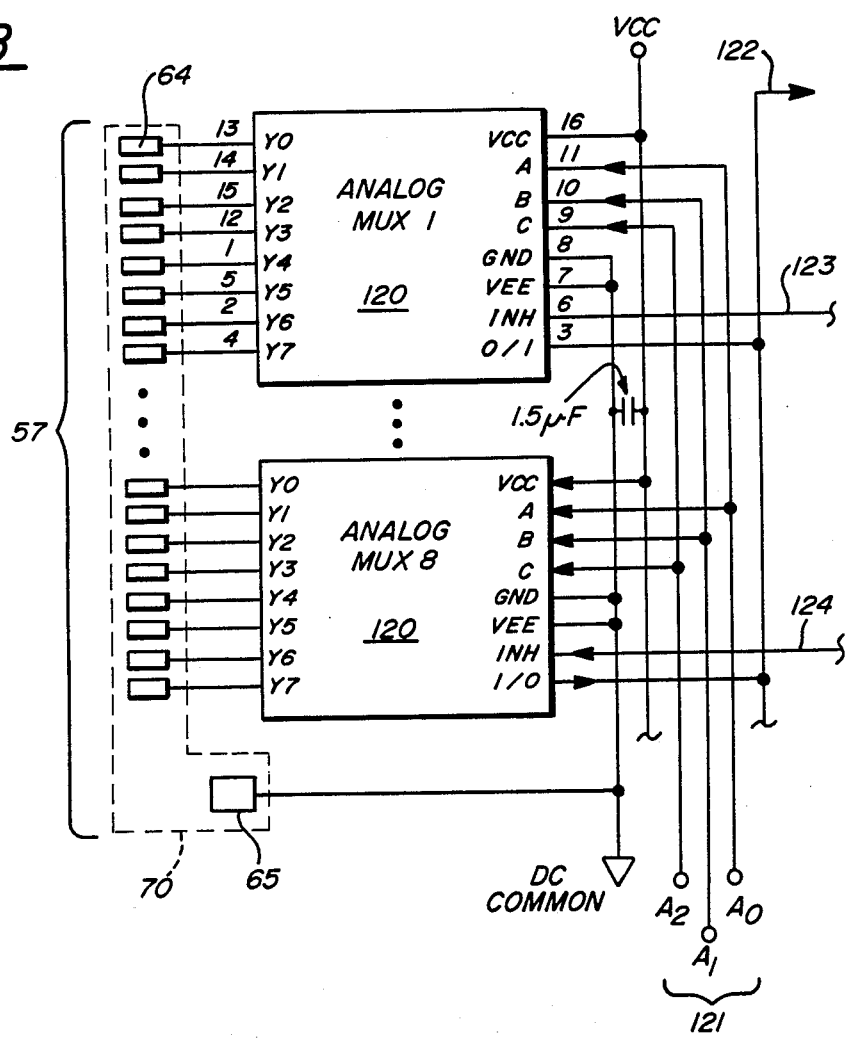
FIG. 5B is a wiring diagram illustrating the electrical interconnection for two of the analog multiplexors depicted in FIG. 5A.
Figure 4:
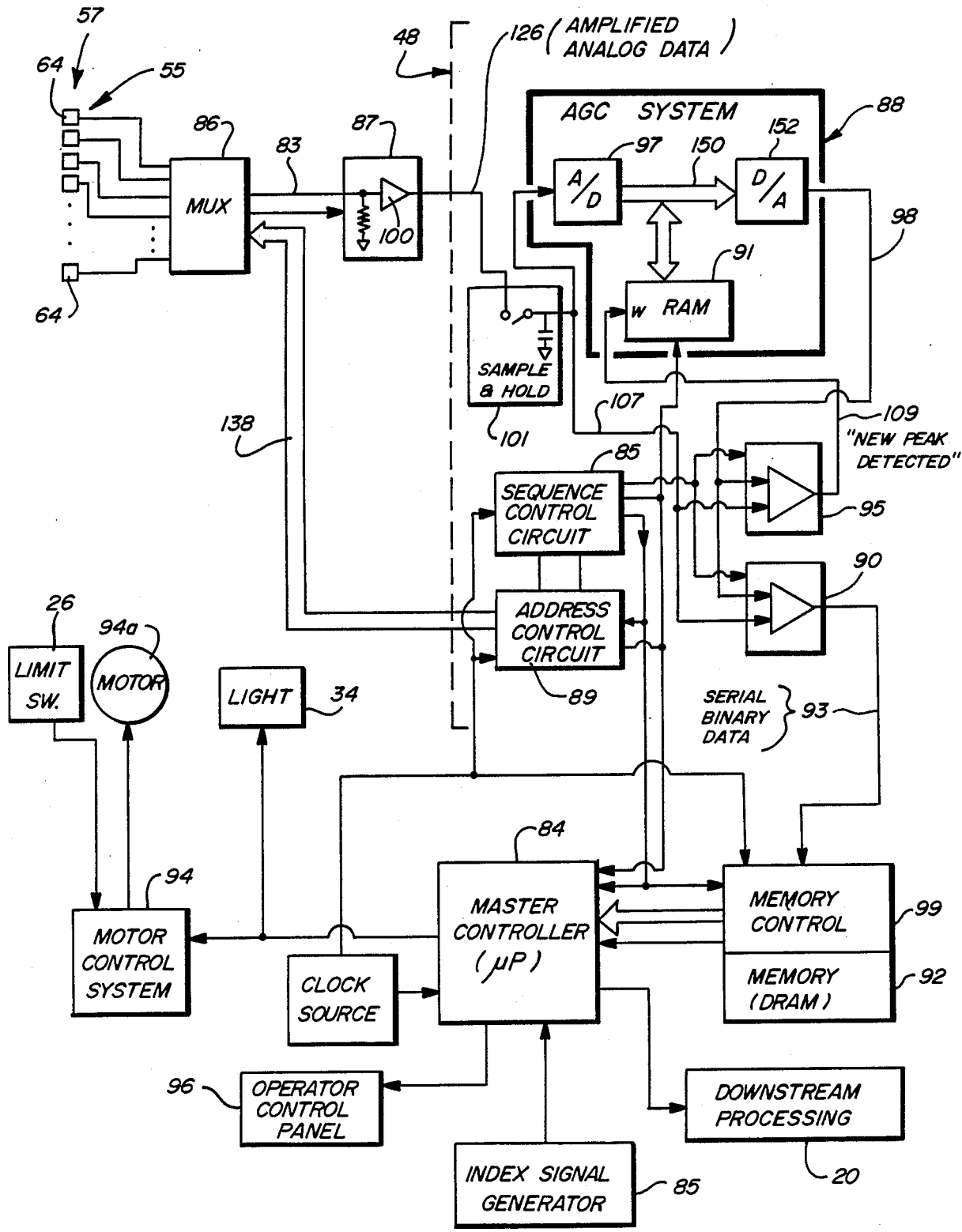
FIG. 4 is a block diagram illustrating the operation of imaging apparatus of the instant invention depicted in FIG. 1.
Figure 5A:
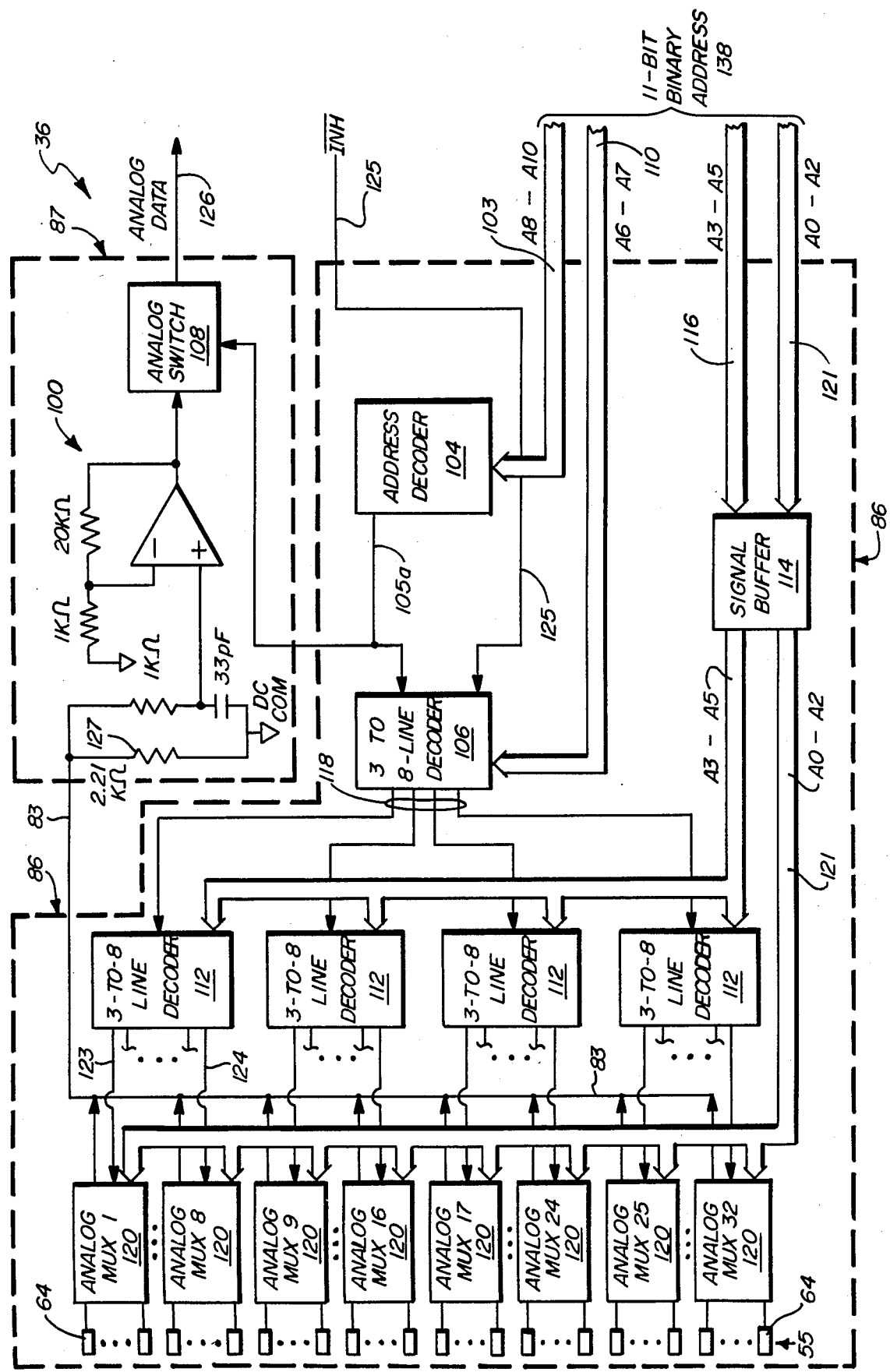
FIG. 5A is a detailed block diagram illustrating one preferred embodiment of an electrical circuit for accessing each of the discrete photosensitive elements included in the photosensor array of FIG. 2C.
Figure 6:
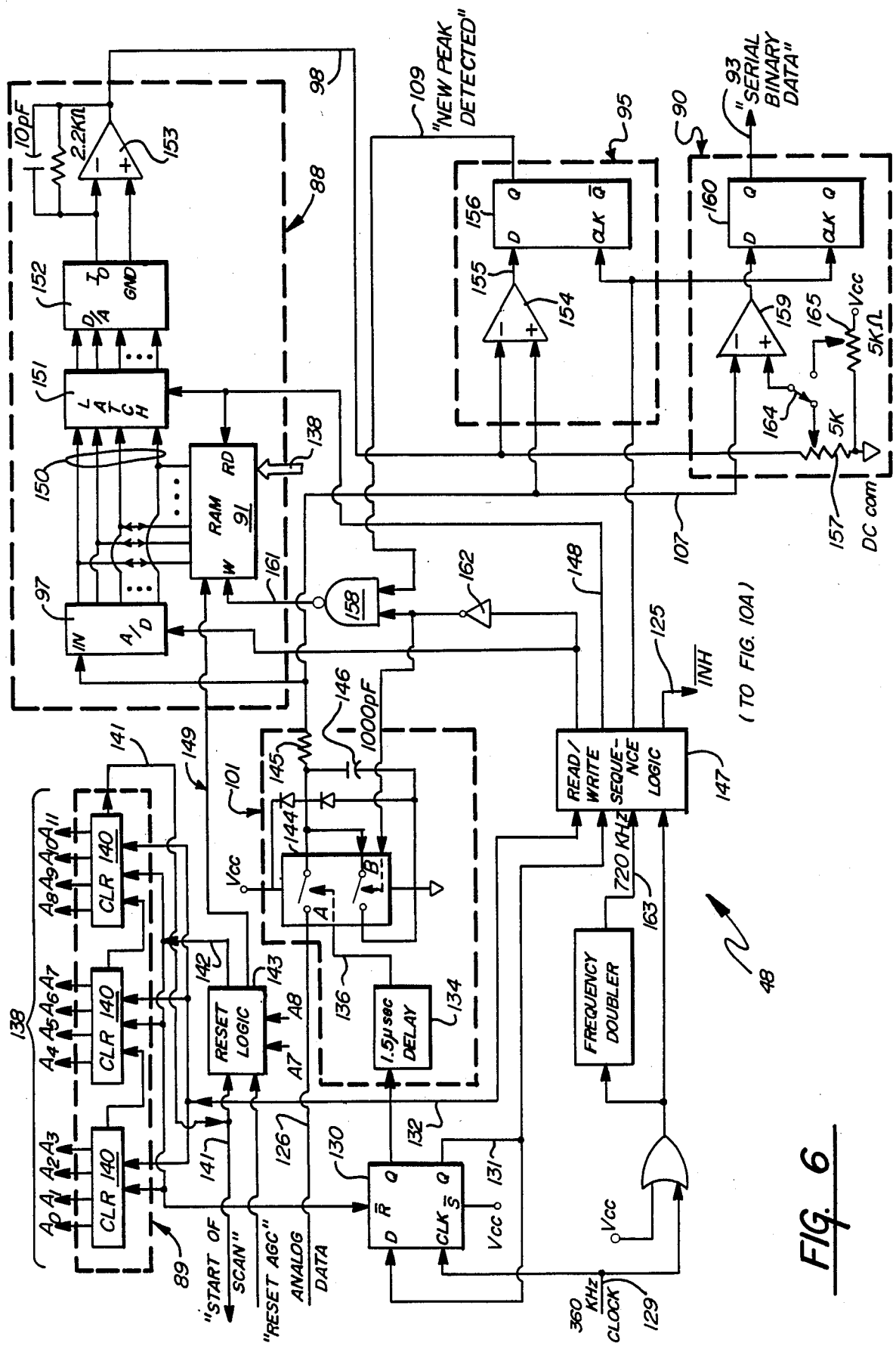
FIG. 6 is a detailed block diagram of one preferred electrical circuit for the signal comparison, automatic threshold adjustment and control electronics of the imaging apparatus of the instant invention.

FIGS. 4 through 6 are devoted to a description of a first embodiment of the electrical circuitry adapted to operate the scanning system of the present invention. Those in the art should appreciate that this embodiment is exemplary and that alternative circuitry can be applied to operate the scanning system of the instant invention with equal effectiveness.

FIG. 4 is a general block diagram of the preferred circuitry of the scanning system of the type shown in FIG. 1. The blocks of circuitry of the imaging system which control the timing and order in which signals are obtained from the individual photosensitive elements of the linear photosensor array 57 are shown in the upper right portion of FIG. 4. This control circuitry is preferably located on a single PC board within the wand. The upper left-hand portion of FIG. 4 shows, in block diagram format the circuitry of the photosensor array.

The functions of the various blocks of circuitry in FIG. 4 can best be described by generally explaining the operation of the imaging system. Typically, the photosensor array 57 receives light reflected from the surface being imaged. A master controller 44, which is preferably microprocessor-based, is provided to control the overall operation of the system, i.e., to initiate the operation of the system and to coordinate its operation with that of auxiliary equipment such as downstream processing equipment 20. The microprocessor 84 initiates the operation of the imaging system when it receives a "start of scan" signal from the index signal generator circuit 85, which circuit 85 allows address control circuit 89 to generate binary addresses corresponding to the individual photosensitive elements 64 in the array 57. The binary addresses are fed out on address bus 138 to a multiplexer 86 associated with the photosensor array 57. The multiplexer 86 (1) recognizes selected addresses impressed on bus 138 wich correspond to specific photosensitive elements 64 associated with the array, (2) sequentially obtains analog signals produced by the selectively addressed photosensitive elements and (3) feeds these analog signals in multiplexed fashion onto an analog bus 83. After passing through an amplifier and isolator circuit 87 which includes an amplifier 100, the multiplexed signals are fed over an analog bus 126 to a sample and hold circuit 101. An automatic gain control (AGC) system 88 is provided to generate a variable threshold signal on line 98 so as to determine whether the amplified sensor signal just received from bus 126 by sample and hold circuit 101 represents a light or dark portion of the overall image 24. The light-dark distinction is made by comparator circuit 90, which circuit 90 produces a digital output signal on line 93. The sample and hold circuit 101 is adapted to receive and hold the amplified signal from the photosensitive elements on output line 107 without change for a brief period to facilitate making this comparison.

If desired, the amplitude of variable threshold signal from the AGC system 88 that is impressed on line 98 may be reduced by some fixed value by placing a signal divider network between line 98 and the negative input to comparator circuit 90. In this manner, it is possible to finely tune the ability of imaging the system to discriminate correctly between light and dark small area portions of a lightly saturated colored image.

If desired, the AGC system 88 can be disabled by connecting the positive input of the comparator circuit 90 to a fixed signal, such as a fixed voltage determined by a voltage divider circuit. Circuitry for doing so is shown in FIG. 6.

The multiplexer 86 and the amplifier 100 are preferably located in close proximity to the photosensitive elements 64 they service, in order to minimize the conductor lengths, reduce fabrication costs, and minimize pick up of electrical noise on low power signal lines. Typically, these elements are disposed within the wand 18, itself. The output signals produced by the comparator circuit 90 may be utilized directly, or may be sent via line 93 to memory control circuit 99 for further processing and conditioning. Circuit 99 is adapted to put the output signals into proper form or format for storage in memory 92 or for being sent to printer 20. To this end, circuit 99 may include a counter system which independently keeps track of the current address generated by the address control circuit 89. Circuit 99 may be implemented, for instance, with a conventional programmable logic array.

The output signals from the comparator circuit 90 preferably take the form of a serial digital bit stream representing the light or dark state of the photosensitive elements 64 as determined by sequentially reading them (that is, sensing the level of the charge stored on them). The multiplexed binary information produced by the comparator circuit 90 may, if desired, be stored in a memory 92. Under control of the microprocessor 84, data from the memory control circuit 99 or stored data from the memory 92 may be sent to a printer, display terminal, or other downstream location for further processing. The use of the memory 92 for data storage makes it possible to obtain additional copies of the last image scanned without the need to operate the wand again. The master controller 84, also is in communication with an index signal generator 85, which provides signals indicative of the wand's position on the image-bearing document it is scanning. These indexing signals are utilized to format the data provided by the photosensor array 57 to enable the proper printing or display of the document which was scanned.

A modified form of the imaging system of FIG. 4 can be created by eliminating the memory 92 and sending the serial data signals from the conductor 93 through a conventional serial-to-parallel conversion circuit associated with memory control circuit 99 and then through the microprocessor controller 84 to downstream processing 20. While this will require a scan of the wand 18 for each copy of the image-bearing surface which may be desired, the absence of the memory IC chips required for the memory 92 will provide an especially economical imaging system of the present type. Almost all of the memory control circuit 99, including the programmable array logic, can be omitted to further reduce costs.

The microprocessor 84 may be further employed to operate a motor control system 94 which energizes a drive motor 94a located in the base station to cause either the wand 18 to scan the stationary document being imaged, or to advance the document past a stationary wand, depending on the exact configuration of the base station. The motor control system 94 preferably includes conventional limit switches 26 which may be mounted to detect end-of-scan conditions. The microprocessor 84 also switches the light source 34 on when a copy is to be made of the image-bearing surface and switches the source off afterwards.

By means of user control buttons located on an operator control panel 96 which is mounted either on the wand or the base station, the microprocessor 84 can be instructed to perform desired operations, such as "COPY", "STOP/CLEAR", and to provide multiple or scaled copies. Providing variable scale for copies involves data manipulation which may be performed by the microprocessor 84 using techniques known in the art that need not be detailed here.

Individual photosensitive elements 64 may have photoresponsive characteristics which differ appreciably. Likewise, their associated electrical circuits and connections, including those within the multiplexer 86 and the amplifier circuit 87 all the way to the analog bus 126, may have also differing electrical characteristics. Thus, equal amounts of light impinging upon respective small area photosensitive elements may generate significantly different signal levels on bus 126. The photoresponsive and/or electrical characteristics of individual photosensitive elements and associated circuits may also change with time due to aging of the optical or electrical components. The contrast of the image to be scanned may also vary greatly, due to the use of colors of widely differing hue and saturation and due to changing illumination conditions, variations in document background color, and the like.

To minimize the impact of such image variables and to assist in producing high quality images, an automatic gain control system 88 is provided, as shown in FIG. 9. AGC system 88 includes a memory 91, which preferably is a random access memory having sufficient size to store at least an 8 bit word or byte of information for every photosensitive element 64 in the array 57. The information stored in discrete word locations in the RAM 91 preferably corresponds to the highest signal levels produced by the individual photosensitive elements 64 during the current scan of the wand 18. The AGC system 88 shown in FIG. 4 helps improve the performance of the imaging system by effectively customizing the comparison made at the comparator circuit 90 to take into account the individual optical and electrical characteristics of each photosensitive element 64, as determined under very recent dynamic conditions of operation.

The AGC system 88 preferably operates as follows. At the beginning of a scan, the sequence control circuit 85 sends a "Clear" signal to RAM 91, causing all memory locations therein to be cleared or set to zero. Thereafter, in synchronism with the operation of the multiplexer 86, and in conjunction with the address produced by address control circuit 89, data stored in the word location of RAM 91 addressed by address generator 89 is read and converted to analog form by the digital-to-analog (D/A) converter 152. The output of D/A converter 152 is compared with the current signal on the analog bus 107. (In practice, the current value may be and preferably is scaled downward by a fixed percentage.) The signal 98 is supplied to one input of comparator circuit 90. The voltage supplied on line 107 to the other input of the comparator 90 is the amplified signal generated by the presently addressed photosensitive element 64, which signal was received and held by the sample and hold circuit 101. If the signal produced by the D/A converter 152 is less than the held signal on line 107, the instant signal level from the specific photosensitive element being addressed must be higher than any previously encountered signals, and the comparator circuit 95 sends, via line 109, a "write" signal to RAM 91, which loads a new value into the presently addressed location in RAM 91. The new value is obtained from the amplified signal from the photosensitive element on the analog bus 126 which has been converted to digital form by the analog-to-digital (A/D) converter 97, and placed on the digital bus 150. If the held signal on line 107 is less than the signal produced by the D/A converter 152, no "write" signal is sent to RAM 91 and the contents of the currently-addressed location of RAM 91 are unchanged.

Using this method, the contents of the locations in RAM 91 (wherein each location corresponds to a different photosensitive element 64 in photosensor array 57) are updated whenever the current signal level of an addressed photosensitive element 64 is higher than the levels previously produced by the same photosensitive element during the current transverse scanning movement of the wand 18. Through this operation, RAM 91 collects a set of digital values which represent both the efficiency of the optical channel of each individual photosensitive element 64 in photosensor array 57 and the efficiency of the electrical channels leading from each photosensitive element 64 to the analog bus 126. These efficiency measurements take in account variations in both the light source 34, the optical path, and in the photoconversion efficiency of the discrete photosensitive elements. The amplitude of the output signal or voltage on line 98 produced by the D/A converter 152 thus represents the maximum brightness received by the corresponding photosensitive element 64 since the wand 18 has begun its present scanning motion.

Alternatively, the AGC system 88 may be modified to store a single peak value for a group of photosensitive elements, said elements 64 characterized by substantially similar electrical responses. For instance, peak photoresponsive values generated by a discrete photosensitive element of the group is utilized as a representative signal against which the compare data signals originating from the other elements, as well as from its own photogenerated value, is compared. Thus, the number of values which need to be stored in RAM 91 can be reduced. As a second example, the peak values from one of the eight photosensitive elements 64 read through a single multiplexer IC chip 120 (shown in FIG. 10B) could be used as a representative value for all eight elements 64 connected thereto. This arrangement has the advantage of minimizing values stored in memory 91, since significant variation in electrical characteristics between the eight electrical switch paths or channels within a single IC chip is unlikely. Accordingly, memory requirements are reduced, while preserving the ability of the AGC system to compensate for variations between groups of the photosensitive elements 64. Since fewer accesses to the AGC system 88 need be made in both of these alternative exemplary embodiments, the overall scanning rate can increase by omitting certain sequence steps during the reading of signals generated by those of elements 64 not used to provide representative peak values.

FIG. 5A is a more detailed schematic diagram showing the electronic circuitry associated with the array 57 of the photosensitive elements. It is generally preferred that this circuitry be disposed upon a PC board 36, located within the wand 18. The circuitry of PC board 36 receives an 11-bit binary address along address bus 138 from the address control circuit 89, which circuit is more specifically described in FIG. 6. The three most significant bits of this address bus on lines A8–A10, identified by reference numeral 103, are received by a three bit address decoder 104 which produces an output signal when the appropriate three bit address is received. This ensures that the microprocessor 84 is accessing the PC board 36 only when necessary. Only when the PC board 36 is selected will its "three line to eight line" decoder 106 and its analog switch 108 be activated. The analog switch 108 is an isolation device used to prevent the communication of spurious signals to the downstream processing circuitry.

Binary address signals on lines A6-A7 identified by reference numeral 110 are received directly by a decoder 106 to specify which one of the four decoders 112 to activate. Binary address signals received on lines A3-A5 identified by reference numeral 116 are passed through a signal buffer 114, which buffer provides proper fan-out of these signals, to the four "three line to eight line" decoders 112. The decoders 112 are individually and sequentially activated by signals sent over lines 118 in response to the address signals A6 and A7 when the decoder 106 is activated. The activated decoder 112 in turn activates only one of the eight analog multiplexers 120 to which it is connected, via lines 123 and 124 that are also connected to analog multipliers identified as "MUX 1" and "MUX 8" respectively. While there are 32 multiplexers 120 on PC board 36, only one multiplexer 120 is activated at any one time. The rest are inhibited so as to prevent spurious signals from reaching line 83. Each of the 32 analog multiplexers 120 receives the least significant address bit signals on lines A0-A2 identified by reference numeral 121, which lines also pass through signal buffer 114 to provide the proper signal fan-out.

When a particular analog multiplexer 120 has been activated, the low order address signals A0 through A2 indicate which one of the eight photosensitive elements 64 to which the multiplexer 120 is connected is to be read. The analog signal of the photosensitive element 64 selected by the particular analog multiplexer 120 is sent over intra-board analog bus 83, through a high frequency noise filter, to the input of a voltage amplifier 100. The amplified signal produced by the amplifier 100 is received by the analog switch 108, which switch is closed when activated, and thereby reaches analog bus line 126.

FIG. 5B is a more detailed schematic diagram showing the preferred wiring arrangement used when the analog integrated circuit (IC) chip used for all of the multiplexers 120 is a Signetics Part No. HEF4051BTD. Typing the "$V_{EE}$" pin of this chip to DC common was found to reduce undesired cross-talk among discrete photosensitive elements 64 which are connected to the same multiplexer chip 120. Each multiplexer 120 is preferably kept continuously inhibited until such time during the scanning of the array 57 that the photosensitive elements 64 thereof are sequentially addressed. In order to improve the signal-to-noise ratio of the signals from the photosensitive elements 64, it has been found beneficial to inhibit each multiplexer except during that period of time required to reach each of said individual photosensitive element 64. Inhibiting each multiplexer 120 when the address impressed thereupon is being changed so as to read the next photosensitive element on the same multiplexer, is an important and effective way to do this. To inhibit each multiplexer 120 in this manner, an inverted inhibit signal from the sequence control circuit 85 is provided to each of the decoders 106 via line 125 as shown in FIG. 5A. When line 125 is low, the decoder 106, and its associated decoders 112 and multiplexers 120, are all inhibited.

The photosensitive elements 64 are each preferably operated as miniature solar cells. The amount of photogenerated current produced by the elements is relatively low, and the capacitance of the elements is relatively high, owing to the relatively large electrode traces and contact pads thereof. Therefore, the photosensitive elements not only produce, but also accumulate charge from one scan to the next, the magnitude of the charge corresponding to the total amount of light incident thereon. Each photosensitive element 64 is preferably completely discharged when read. A preferred method of reading a photosensitive element 64 involves passing its accumulated charge through its multiplexer 120 to line 83, and dumping this charge across a grounded load resistor 127 (See FIG. 5A). The flowing charge generates a voltage across the resistor 127, and the magnitude of the voltage corresponds to the level of the accumulated charge. This voltage is fed through a high frequency noise filter to the positive input of the amplifier 100. The noise filter is typically an RC filter which reduces the stray signals on line 83, induced by switching of the decoder 112. The amplifier 100 amplifies the input voltage by some fixed amount such as twenty times. The amplified signal is then passed through the analog switch 108 to the bus 126 as previously described.

It has been found that the amplified signal from each of the photosensitive elements 64 uniformly rises quickly to some characteristic maximum value in about one-half microsecond or less and then steadily decays along some RC time constant curve. The rate of decay is largely determined by the capacitance of the elements 64, the stray capacitance in the connections through the analog multiplexers to the bus 83, and the value of the resistors 127. The magnitude of the voltage developed across the resistor 127 is largely proportional to the amount of accumulated charge on each photosensitive element 64. The sample and hold circuit 101 (shown in simplified fashion in FIG. 4) is preferably operated so as to sample the amplified decaying signal on the bus 166 at some point approximately midway through the several microsecond read time used for each photosensitive element. This timing arrangement and circuit 101 are more completely described in conjunction with FIG. 6.

One important advantage of using this and other signal processing techniques and photosensitive elements described herein is that the signal-to-noise (S/N) ratios for the imaging system are very high, generally 40 dB and above, and may be 45 dB to 50 dB or better under adequate illumination conditions and charging times as described elsewhere herein. This high S/N ratio is achieved in part by minimizing the number of digital or extraneous analog signals changing state in the electronic circuitry of the wand 18 during the initial reading of each photosensitive element 64 until the sample and hold circuit 101 begins to hold the sampled amplified signal from the bus 126. The foregoing sampling is preferably during a quiescent period after all of the switching transients associated with the addressing circuitry 89, address bus 138, switching multiplexers 120 and the like have passed, thereby improving the S/N ratio. Furthermore, the amplifier circuits and associated components are selected and arranged to be sufficiently slower than the transient switching effects so that there is still a representative analog signal being produced from the photosensitive elements 64 at the sampling time. In this manner, electrical noise from all other data and control signal sources is substantially eliminated or at least greatly reduced.

To maximize the linearity of the individual photosensitive elements 64 when operating in the photogeneration mode, it is preferred that the photosensitive elements, when under full illumination (i.e., sensing a fully white surface) only charge to 10 to 20 percent of their open circuit voltage $V_{OC}$ (i.e., the maximum charge and voltage of the solar cell if allowed to charge indefinitely). For the diode configurations of FIG. 2C, the $V_{OC}$ is about 0.6 volts. The intensity of the illumination provided by the light source 34 directly affects the rate at which the photosensitive elements 64 will charge. Under illumination levels about $1 \times 10^{-4}$ watts cm$^{-2}$, the charging times required for the diode photosensitive elements 64 of the type shown in FIG. 2C to achieve 10 to 20 percent of $V_{OC}$ is on the order of one to ten milliseconds; and is typically three to eight milliseconds, depending on the spectral distribution of the incident light, the spectral response or collection efficiency of the photosensitive elements, and the like.

It has been determined that a linear photosensor array 57 as described herein, and fabricated from amorphous silicon alloy semiconductor material, and operated in the fourth quadrant mode as described herein, is very well suited for high speed image scanning. Such a linear photosensor array has the ability to supply analog (video) data at rates sufficient to meet CCITT Group 2 and Group 3 facsimile standards. It has also been found that signal-to-noise ratios and "gray scale" detection capabilities are also excellent, in spite of the very low voltage and charge generating capabilities of the individual photosensitive elements 64.

In an embodiment as described hereinabove, it is preferred to actually read each individual photosensitive element 64 within a period of approximately four microseconds or less. As will be seen with respect to FIG. 11, the actual time required to read each photosensitive element by sample and hold techniques can be in the range of about two microseconds or less. Following each scan, an interval of about 0.7 milliseconds is preferably provided before the next scan begins, during which time the microprocessor 84 performs house-keeping functions, which include checking the pushbuttons at the operator control station, checking the end-of-scan limit switches and similar routine status checks. The repetition period for the scanning operation is thus about 7.5 milliseconds. The outputs of photosensitive elements 64 in the photosensor array 57 are preferably read consecutively in accordance with monotonically changing value of the 11-bit address input provided to the circuitry on the PC board 36. The analog data thus read from the elements 64 is sent from the PC board 36 via the analog bus 126 to the automatic gain control circuitry 88 and the comparator circuitry 90 and 95, which circuitry may be located on a circuit board in the wand 18 or in the base station.

The photosensitive elements 64 may alternatively be read by utilizing the amplification circuit 100 as a current amplifier (rather than as a voltage amplifier as described above). To transform the amplifier circuit 100 of FIG. 5A into a current amplifier, simply omit the resistor 127 and directly connect line 83 to the positive input of the operational amplifier in circuit 100. This current amplification embodiment provides the important advantages of achieving: (1) even faster reading speeds, (2) improved signal-to-noise ratios, (3) greater linearity of true correspondence amount of charge stored on each element 64 and the amplitude of the amplified data signal captured by sample and hold circuit 101 an (4) reduced current leakage between adjacent elements 64. For example, tests show that with the Texas Instruments operational amplifier specified for circuit 100 in the table below, each of the elements 64 can be read in approximately 600 nanoseconds. By using circuit components having even faster slew rates, reading time may be further shortened, thereby providing the scanning rate of the imaging system to be significantly increased.

FIG. 6 is a schematic diagram of the automatic gain control and comparator circuitry. A flop-flop 130 receives a 360 kilohertz clock signal on line 129 from a suitable external clock source such as the conventional time base used by the microprocessor 84. The flip-flop 130, operating in "divide-by-2" mode, produces a 180 kilohertz clock signal on line 132 and its complement on line 131. The 180 kilohertz clock signal on line 132 is fed to a delay device 134 of the sample and hold circuit 101. The delay device 134 provides a predetermined microsecond range time delay signal on line 136. When the amplifier circuit 100 is adapted for use as a voltage amplifier, the device 134 holds its output on line 136 high for a brief period, preferably in the range of 1.3 to 1.5 microseconds following the rising edge of the clock signal on line 132, and then allows output 136 to go low again, thus creating a signal useful for precisely timing the sampling period of the circuit 101. When the circuit 100 is a current amplifier, the delay device 134 is adapted to only hold line 136 high for about 600 nanoseconds.

The clock signal on line 132 is also used to generate the 11-bit address 138 used by the circuitry of the PC board 36 shown in FIG. 5A. The 11-bit address control circuit or generator 89 may comprise three binary 4-bit counters 140 connected to count in synchronism with the clock signal on line 132. The address generator 89 repetitively counts from 0 to 256, creating a sequentially ascending address on the address bus 138, and continues counting up to 384, at which time it produces an overflow signal on line 141, "Start of Scan". The 128 extra counts by the address control circuit 89 provide time for the microprocessor 84 to take care of its housekeeping functions. A reset signal is produced on line 142 in response to a "Start of Scan" signal on line 141, which signal is sent to the microprocessor 84 at the start of each new scan of the array 57. The "Start of Scan" signal is sent from the counters 140 to ensure that the time between scans of any one of the photosensitive elements 64 is always the same. If the time is not the same, the charge integrated by the elements 64 will vary, even though the illumination is the same, thus defeating the benefits provided by the AGC system. Generating the "Start of Scan" from the counters and counting down the clock signal, ensures consistent timing. The microprocessor 84 then is driven by the "Start of Scan" signal and slaves all its operations to this signal. Reset logic 143 also produces a signal on line 149 which clears the contents of RAM 91, when a "Reset AGC" signal is received from the microprocessor 84 at the beginning of the scanning motion by the wand 18.

In alternative embodiments of the address control circuitry 89, the counters 140 are arranged to count downward and upward, as desired. To count downward, the number 256 is loaded into the counters, and the counters are decremented through zero, all the way to −128 to provide the same amount of time for the microprocessor 84 to perform its housekeeping functions. This bidirectional counter address control circuit 89 is particularly useful for those embodiments scanning apparatus which do not use a memory 92 to temporarily store serial binary data from the photosensitive elements 64 before sending this data to the printer 20. This features allows for ready bi-directional scanning. When the wand 18 scans the image-bearing document in one direction (such as from left to right), the array 57 is scanned from top to bottom by having the address control circuit 89 count up from zero; and when the wand 18 scans the image-bearing document in the other direction (such as right to left), the array 57 can be scanned from bottom to top by having the address control circuit 89 count from 256 downward. In this manner, the serial binary data stream on line 93 is always loaded into the serial shift register buffer from the print head of printer 20 in the same direction, which loading avoids the problem of having a reversed image on the copy 22 produced by the printer.

The analog data successively produced by the PC board 36 is sent over the analog bus 126 and is received by a solid state relay chip 144, which contains two independent relays (A and B) each having a normally open contact. Contact A is held closed for the fixed time period created by the delay device 134 when the signal 136 goes high. During this time period the amplified analog data signal on the bus 126 is placed on a charge holding capacitor 146. The amplified signal is preferably sampled by retaining the voltage across the capacitor 146 at the moment contact A opens in response to signal the 136 going low. This is achieved by selecting the gain and time constants of the amplifier 100 and the size of the capacitor 146 so as to allow the amplified signal level or voltage on the bus 126 to reasonably and faithfully reproduce the decaying portion of the unamplified analog signal from the addressed photosensitive elements 64.

As previously explained, the amplitude of the amplified signal on the bus 126 is proportional to the total charge accumulated by the addressed photosensitive elements 64 since the last time it was read. Accordingly, the sampled voltage held on the capacitor 146 when contact A opens is proportional to, and provides a finely graduated indication of, the total accumulated charge that was present on the photosensitive element 64 just before it is read (up to 16 or more levels of "gray scale"). This sampled or held voltage is preserved in an unchanging state while the further steps are carried out.

Following the aforementioned time delay, and upon receipt of a "Read Data" command on line 148 produced by the read/write sequence logic circuit 147 in synchronism with the clock signal 132, the contents of the location of RAM 91 currently addressed on the address bus 138 by the address generator 89 are read onto eight parallel data lines 150. Next, the data on lines 150 are clocked into 8-bit latch 151 by the signal received over line 148. This parallel binary signal is converted to an analog signal by the D/A converter 152, whose output is fed to the operational amplifier 153, which is preferably configured as a current amplifier.

The output of the operational amplifier 153 is presented via line 98 to a voltage divider leading to the negative input terminal of the comparator 90 and to the negative input terminal of the comparator 95 as shown in FIG. 6. The sampled or held voltage on the capacitor 146 is presented via line 107 to the positive input of the comparator 90 and the positive input of the comparator 95. The front end of the comparators 90 and 95 are preferably operational amplifiers 154 and 159 arranged in open loop configuration as shown. Due to the high gain of the differential amplifier 154, the difference between the present value of the held signal on the capacitor 146 and the previous peak value stored in the addressed location on RAM 91 and read from RAM 91, creates a binary signal on line 155 which is positive if the new value is greater than the old value. This signal is sent to the flip-flop 156 whose output is sent to the NAND gate 158 whose output is in turn connected by line 161 to the RAM 91. The other signal input to the NAND gate 158 through the inverter 162 is the "Write Enable" signal which is generated in synchronism with the clock signal by the read/write logic 147. Upon receiving the "Write enable" signal, the A/D converter 97 presents, on lines 150, the digital value of the voltage held on the capacitor 146. Receipt of a "Write" signal on line 161 by the RAM 91 causes the RAM 91 to read and store the digital value on lines 150 produced by the A/D converter 97. This digital value is stored in a eight bit byte location in RAM 91 whose address corresponds to that of the currently addressed photosensitive element 64. The foregoing sequence of signal transfers and comparisons ensures the storage, in digital form, in RAM 91, of the signal level corresponding to the brightest image yet received by the currently addressed photosensitive element 64.

To the negative terminal of the amplifier 159 is presented one of two voltage values which will depend upon the position of two position manual selector switch 164. When the switch 164 is in the position opposite that shown in FIG. 6, a voltage which represents either a fixed threshold voltage expressed as a percentage of the supply voltage $V_{CC}$ determined by the setting of a potentiometer 165 is presented. When the switch 164 is in the position shown in FIG. 6, a voltage which is a fixed percentage (as determined by the setting of the potentiometer 157) of the peak value stored in RAM 91 in the location corresponding to the currently addressed photosensitive element 64 is presented. This fixed percentage may be in the range of 50 to 90 percent and preferably is in the range of 60 to 80 percent. If the output of amplifier 159 is high, the analog voltage held on the capacitor 146 is interpreted as a binary "one". If it is low it is interpreted as a binary "zero". This signal is sent to the D input of the flip-flop 160 to produce a data signal on line 93 corresponding to the output of the comparator 159. Binary data signals produced in this fashion are sent by line 93 to the memory 92 for further processing. If desired, the digital data signal produced can be complemented such as by selecting the complemented output of the flip-flop 160.

The identities of typical components used in the circuits of FIGS. 4–6 are given in the following table, it being understood that other similar or equivalent components could be substituted by one of skill in the art:

| Reference No. | Individual Part | Part No. |
| --- | --- | --- |
| 84 | Microprocessor | Intel 8031 |
| 100,153 | Operational Amplifier | Texas Instrument (TI) TL071 |
| 154,159 | Comparator | National Semiconductor Corp. (NSC)LM311 |
| 91 | RAM (2k byte) | Motorola 6116 |
| 92 | Memory | Texas Instruments DRAM TMS 4256 |

-continued

| Reference No. | Individual Part | Part No. |
| --- | --- | --- |
| 152 | D/A Converter | Motorola MC 1408 |
| 95 | Stepping Motor | Oriental Motors |
| 97 | A/D Converter | NSC ADC0802 |
| 104,102,112 | Decoder | Signetics 74HC138 |
| 108 | Analog Switch | Signetics 74HC4051 |
| 114 | Signal Buffer | Signetics 74HC14 |
| 120 | Analog Multiplexer | Signetics 74HC4051 |
| 130,156,160 | Flip-flop | NSC 74HC74 |
| 134 | Delay Device | NSC 74HC123 |
| 140 | 4-bit Up-Down Counters | NSC 74HC191 |
| 144 | Solid-State Relay | NSC CD4066 |
| 151 | 8-bit Latch | RCA 74HC374 |
| 158 | NAND Gate | NSC 74HC00 |

The remaining portions of the scanning apparatus which have not been described in detail above may be implemented using conventional circuits and components known to those in the art. Armed with the foregoing description, those skilled in the art could, without undue experimentation, readily design, construct, and program the microprocessor-based controller 84, the address control circuit 89 and the memory control circuit 99 to perform in the manner described above. Accordingly, these details of the scanning apparatus require no further description here.

In an alternate embodiment, all of the circuitry and functions performed by components on the PC board 48 could be implemented with completely digital circuitry, using, for example, a single high speed data acquisition microprocessor chip with associated memory such as a suitably sized RAM. In such an embodiment, the analog signal on the bus 126 would initially be converted into digital form. Thereafter, this digital value would be digitally compared with one or more stored digital values obtained from its RAM to obtain the same functional results achieved by the analog comparator circuits 90 and 95 in FIG. 6. The output from such a chip may take a parallel data stream of a serial RS-232 data stream or of 8 bit words packed with bits representing the light/dark status of adjacent photosensitive elements.

The preferred embodiments of the scanning apparatus described above have been designed and constructed largely with discrete integrated circuit components, but could be implemented, if desired, in a much more fully integrated fashion, for example, by using custom LSI chips to implement the circuit functions of the PC boards 36 and 48, or by using thin film diodes and transistors formed on the same or discrete substrates by the same or similar deposition and processing steps used to create the thin film photosensitive elements 64.

What is claimed is:

1. A digitizer adapted to generate detectable electrical signals corresponding to an image on an image-bearing member comprising:

an elongated digitizing wand, said wand sized and shaped for portable use and adapted to be manually moved across and thereby scan an image-bearing member; said wand including a photoresponsive array of light sensitive elements, each light sensitive element including at least one layer of amorphous silicon alloy material including hydrogen and fluorine; each light sensitive element adapted to receive light from a corresponding small area portion of said image-bearing member and generate a detectable signal representative of the amount of received light;

a base station, said station including: means for receiving said image-bearing member; means for removably supporting said portable wand; and drive means for providing relative motion between said member and said wand at a preselected rate of speed, whereby said digitizer is adapted to manually as well as automatically scan an image-bearing member.

2. A digitizer adapted to generate detectable electrical signals corresponding to an image on an image-bearing member comprising:

an elongated digitizing wand, said wand sized and shaped for portable use and adapted to be manually moved across and thereby scan an image-bearing member; said wand including a photoresponsive array of light sensitive elements, each light sensitive element including at least one layer of amorphous silicon alloy semiconductor material including hydrogen, fluorine and a band gap modifying element; said modifying element adapted to adjust the photoresponse of said elements to specific wavelengths of incident radiation; each light sensitive element adapted to receive light from a corresponding small area portion of said image-bearing member and generate a detectable signal representative of the amount of received light;

a base station, said station including: means for receiving said image-bearing member; means for removably supporting said portable wand; and drive means for providing relative motion between said member and said wand at a preselected rate of speed, whereby said digitizer is adapted to manually as well as automatically scan an image-bearing member.

* * * * *